United States Patent
Schaaf

(10) Patent No.: US 12,177,246 B2
(45) Date of Patent: Dec. 24, 2024

(54) DETECTING MALICIOUS EMAIL CAMPAIGNS WITH UNIQUE BUT SIMILARLY-SPELLED ATTACHMENTS

(71) Applicant: Bank of America Corporation, Charlotte, NC (US)

(72) Inventor: Mark Schaaf, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 124 days.

(21) Appl. No.: 18/121,885

(22) Filed: Mar. 15, 2023

(65) Prior Publication Data

US 2024/0314161 A1    Sep. 19, 2024

(51) Int. Cl.
*H04L 9/40* (2022.01)
*H04L 41/16* (2022.01)
*H04L 51/08* (2022.01)

(52) U.S. Cl.
CPC ............ *H04L 63/145* (2013.01); *H04L 41/16* (2013.01); *H04L 51/08* (2013.01)

(58) Field of Classification Search
CPC ....... H04L 63/145; H04L 41/16; H04L 51/08; H04L 51/21; H04L 9/40
USPC ......................................................... 726/22
See application file for complete search history.

(56) References Cited

U.S. PATENT DOCUMENTS

| | | |
|---|---|---|
| 8,463,658 B2 | 6/2013 | Racco |
| 8,566,115 B2 | 10/2013 | Moore |
| 8,910,279 B2 | 12/2014 | Yanovsky et al. |
| 9,210,182 B2* | 12/2015 | Wright .................... G06F 11/28 |
| 9,390,151 B2 | 7/2016 | Briere et al. |
| 9,413,716 B2 | 8/2016 | Windsor et al. |
| 9,548,988 B1* | 1/2017 | Roundy ................ G06F 21/566 |
| 9,635,052 B2 | 4/2017 | Hadnagy |
| 9,760,548 B2 | 9/2017 | Cooke et al. |
| 10,291,646 B2 | 5/2019 | Stolarz et al. |
| 10,313,387 B1 | 6/2019 | Kras |
| 10,489,587 B1* | 11/2019 | Kennedy ................ G06N 5/045 |
| 10,812,527 B2 | 10/2020 | Irimie et al. |
| 10,855,716 B2 | 12/2020 | Irimie et al. |
| 10,880,322 B1 | 12/2020 | Jakobsson et al. |
| 11,102,244 B1 | 8/2021 | Jakobsson et al. |
| 11,431,749 B2 | 8/2022 | Kalinin |
| 11,470,029 B2 | 10/2022 | Ryan et al. |

(Continued)

*Primary Examiner* — Sargon N Nano
(74) *Attorney, Agent, or Firm* — Banner & Witcoff, Ltd.

(57) ABSTRACT

Processes and machines are disclosed for detecting malicious email campaigns based on unique but similarly spelled attachments. Email log(s) from network appliances are retrieved, filtered, normalized, and converted into field-based organized data for comprehensive analysis. Cluster analysis is performed. Filenames of email attachments are transformed into numerical vectors and a cosine similarity termset analysis is performed on the numerical vectors. Data is organized into time bins for burst detection. Statistical analysis is performed on the time bins. Pattern recognition is performed to identify alphanumeric similarities in the filenames of the attached files in order to detect malicious email campaigns. Machine learning may be used to optimize the cosine similarity threshold and other query variables, and to update existing cybersecurity filters and firewalls. Mitigation can be performed to remove malicious emails that were delivered to recipient mailboxes.

20 Claims, 9 Drawing Sheets

(56) References Cited

U.S. PATENT DOCUMENTS

| | | | |
|---|---|---|---|
| 11,636,161 B1* | 4/2023 | Chang | G06F 16/906 707/737 |
| 2017/0093771 A1* | 3/2017 | Gatti | H04L 51/48 |
| 2018/0060580 A1* | 3/2018 | Zhao | G06N 20/20 |
| 2019/0114419 A1* | 4/2019 | Chistyakov | G06F 17/15 |
| 2019/0171816 A1* | 6/2019 | Copty | G06N 20/00 |
| 2019/0213498 A1 | 7/2019 | Adjaoute | |
| 2020/0053111 A1 | 2/2020 | Jakobsson | |
| 2020/0082083 A1* | 3/2020 | Choi | G06N 20/00 |
| 2020/0162510 A1 | 5/2020 | Irimie et al. | |
| 2020/0344251 A1* | 10/2020 | Jeyakumar | H04L 51/212 |
| 2020/0396190 A1* | 12/2020 | Pickman | H04L 67/306 |
| 2021/0058395 A1 | 2/2021 | Jakobsson | |
| 2021/0097177 A1* | 4/2021 | Chistyakov | G06F 21/56 |
| 2021/0136110 A1 | 5/2021 | Sites | |
| 2021/0240836 A1 | 8/2021 | Hazony et al. | |
| 2022/0078197 A1 | 3/2022 | Jakobsson et al. | |
| 2022/0217164 A1* | 7/2022 | Hewlett, II | H04L 63/0227 |
| 2023/0098812 A1* | 3/2023 | Rivlin | H04L 63/0236 726/22 |
| 2023/0224327 A1* | 7/2023 | Haworth | H04L 63/1441 726/23 |

* cited by examiner

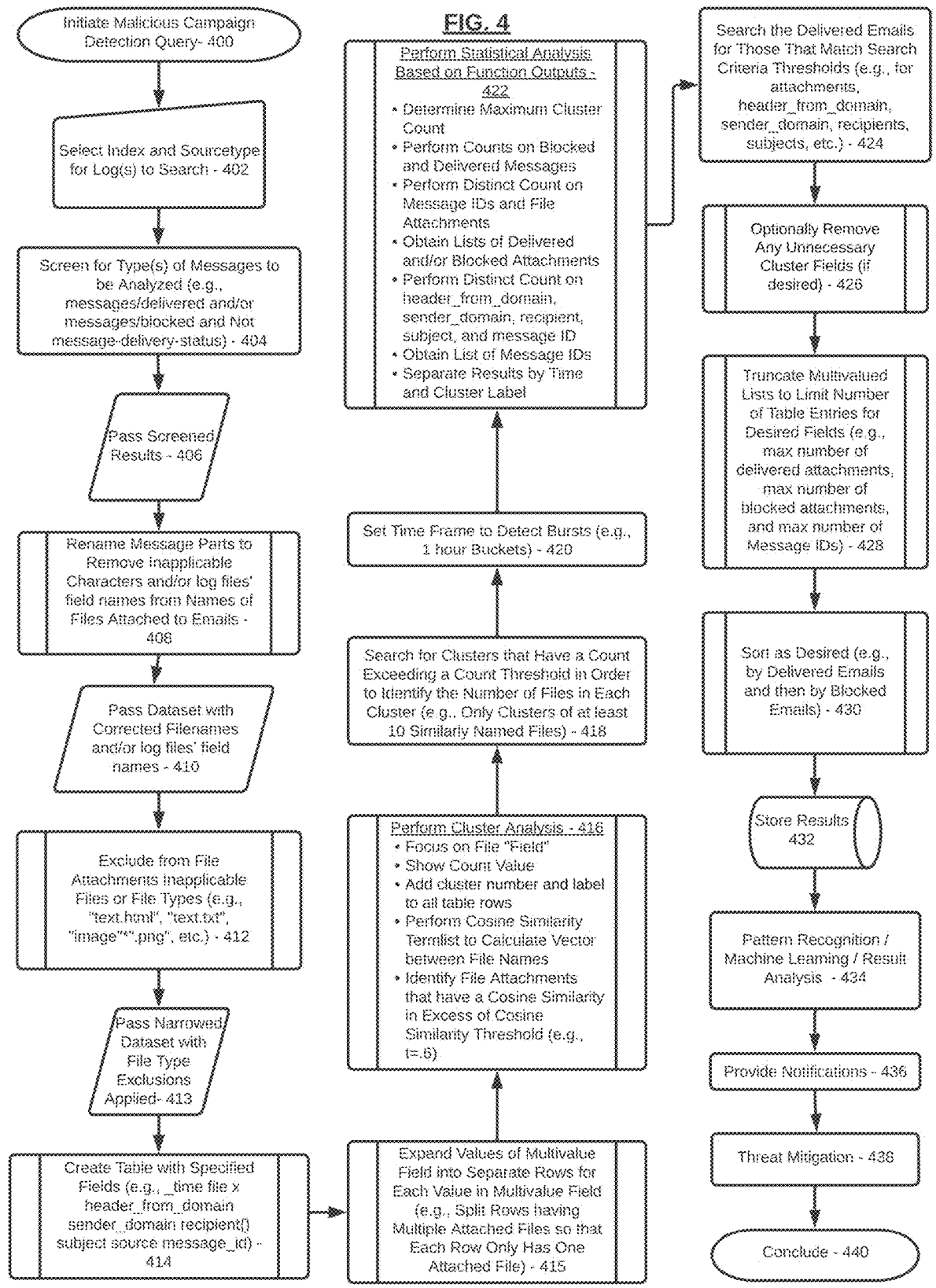

Table - 500

| | 502 | 504 | 506 | 508 | 510 | 512 | 514 | 516 | 518 | 520 | 522 | 524 |
|---|---|---|---|---|---|---|---|---|---|---|---|---|
| | A | B | C | D | E | F | G | H | I | J | K | L |
| 1 | _time | deliver ed | block ed | dc_att achm ents | sample_deliv ered_attach ments_max5 | sample_bloc ked_attachm ents_max5 | dc_he ader_f rom_d omain | dc_sen der_do main | dc_reci pient | dc_su bject | dc_mes sage_id | sample_message_ids_max5 |
| 2 | 2022-11-30T19:00:00.0 00+0000 | 6 | 26 | 30 | wp#2346.html wp#4371.html wp#7170.html wp#7220.html wp#8606.html | wp#1280.html wp#1321.html wp#1524.html wp#1777.html wp#1825.html | 29 | 31 | 28 | 31 | 32 | <sanitized_message_id@sanitized_domain_1> <sanitized_message_id@sanitized_domain_2> <sanitized_message_id@sanitized_domain_3> <sanitized_message_id@sanitized_domain_4> <sanitized_message_id@sanitized_domain_5> |
| 3 | 2022-11-30T21:00:00.0 00+0000 | 5 | 7 | 11 | wp#1260.html wp#3304.html wp#5632.html wp#5988.html wp#6683.html | wp#1280.html wp#1748.html wp#2956.html wp#3777.html wp#6192.html | 12 | 12 | 10 | 9 | 12 | <sanitized_message_id@sanitized_domain_1> <sanitized_message_id@sanitized_domain_2> <sanitized_message_id@sanitized_domain_3> <sanitized_message_id@sanitized_domain_4> <sanitized_message_id@sanitized_domain_5> |
| 4 | 2022-11-30T20:00:00.0 00+0000 | 4 | 19 | 22 | wp#1825.html wp#2242.html wp#3777.html wp#6607.html wp#6993.html | wp#2529.html wp#3051.html wp#3310.html wp#3777.html | 20 | 21 | 22 | 23 | 23 | <sanitized_message_id@sanitized_domain_1> <sanitized_message_id@sanitized_domain_2> <sanitized_message_id@sanitized_domain_3> <sanitized_message_id@sanitized_domain_4> <sanitized_message_id@sanitized_domain_5> |
| 5 | 2022-11-30T18:00:00.0 00+0000 | 1 | 20 | 20 | wp#6425.html | wp#1101.html wp#1280.html wp#1555.html wp#1748.html wp#1943.html | 17 | 21 | 21 | 20 | 21 | <sanitized_message_id@sanitized_domain_1> <sanitized_message_id@sanitized_domain_2> <sanitized_message_id@sanitized_domain_3> <sanitized_message_id@sanitized_domain_4> <sanitized_message_id@sanitized_domain_5> |
| 6 | 2022-11-30T17:00:00.0 00+0000 | 1 | 19 | 20 | wp#7170.html | wp#1321.html wp#1797.html wp#1849.html wp#2293.html wp#2274.html | 16 | 19 | 20 | 20 | 20 | <sanitized_message_id@sanitized_domain_1> <sanitized_message_id@sanitized_domain_2> <sanitized_message_id@sanitized_domain_3> <sanitized_message_id@sanitized_domain_4> <sanitized_message_id@sanitized_domain_5> |

FIG. 5A

Table - 500

| _time | sample_delivered_attachments_max5 |
|---|---|
| 2022-11-30T19:00:00.000+0000 | wp2246.html<br>wp4371.html<br>wp7170.html<br>wp7220.html<br>wp8604.html |
| 2022-11-30T21:00:00.000+0000 | wp1286.html<br>wp3304.html<br>wp5533.html<br>wp5986.html<br>wp6688.html |
| 2022-11-30T20:00:00.000+0000 | wp2242.html<br>wp3777.html<br>wp6807.html<br>wp6695.html |
| 2022-11-30T18:00:00.000+0000 | wp6426.html |
| 2022-11-30T17:00:00.000+0000 | wp7170.html |
| 2022-11-30T22:00:00.000+0000 | wp6226.html |

FIG. 5B

DETECTING MALICIOUS EMAIL CAMPAIGNS WITH UNIQUE BUT SIMILARLY-SPELLED ATTACHMENTS

TECHNICAL FIELD

The present disclosure relates to processes and machines for information security and, in particular, to ensuring data integrity by scanning of software or data or otherwise monitoring data to prevent or detect malicious email-campaign attacks.

DESCRIPTION OF THE RELATED ART

Malicious email attachments are one of the most common ways malware is spread. Malicious attachments can be disguised as important documents, invoices, etc.

Emails often attempt to trick the user into opening malicious files, infecting the user's computer or a company network with malware.

The US Cybersecurity and Infrastructure Security Agency (CISA) states that most users contract viruses by opening and running unauthorized email attachments.

Consequently, it is of paramount importance to prevent emails with malicious attachments from being opened in recipients' mailboxes.

Cyberattacks may not be fully prevented wherein the attacker sends many e-mails from multiple domains to multiple recipients within a short timeframe containing malicious file attachments that were different from each other but spelled similarly. This lack of prevention appeared to be most likely due to the "similar but unique" characteristic of the attachments' filenames that can obscure detection.

Traditional antivirus software and enterprise cybersecurity solutions are currently ineffective at defending against these types of malicious email campaigns.

Hence there is a long felt and unsatisfied need to transform and utilize email log data for email with attachments that penetrated existing cybersecurity devices and software in order to identify malicious email campaigns and then provide notifications or take immediate mitigation actions. There is also a need to learn from past attacks in order to better prevent future campaigns.

SUMMARY OF THE INVENTION

In accordance with one or more arrangements of the non-limiting sample disclosures contained herein, solutions are provided to address one or more of the shortcomings in the field of information security by, inter alia: (a) providing an analytical query mechanism to identify attachments that were similarly spelled that were also sent from multiple domains to multiple recipients within a short timeframe; (b) utilizing cosine similarity thresholds to identify "similar but unique" attachment filenames; (c) performing cluster analysis; (d) performing pattern recognition; (e) mitigating threats by removing infected emails that had already been delivered to recipients' mailboxes; and (f) machine learning to optimize cluster analysis and cosine-similarity vector-comparison functions.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a person of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, an information-security process for detecting malicious email campaigns based on attachment file name similarity may identify an index and source-type for email logs to be analyzed. A source may be specified to select "messages/delivered" and/or "messages/blocked." Other sources, such as message-delivery-status may be excluded. Any incompatible characters in filenames of the email attachments can be removed. A function may be performed to remove statistically unhelpful filenames and files from the analysis such as, for example, file attachments named "text.html" or "text.txt", and that are image files that have a prefix of "image," then have a number, and end in a *.png file extension. Organized data may be created out of the log data to setup a table or data structure to delimit fields such as, for example, time/date stamps for messages, filenames, header domain information, sender domain information, lists of recipients, message subjects, and unique message identifiers. A multi-value expansion may be performed on the data to split fields with multiple values into separate data entries. A cluster analysis may be performed to show counts and perform a cosine similarity analysis on email attachment filenames. A search may be performed to limit results to analyze only those that exceed a certain cluster count (e.g., >10). A time period may be designated to aggregate data into bins or time buckets for burst detection. A statistical analysis function may be performed to perform counts, identify distinct counts, obtain data values, and organize the output by time and cluster labels. Further filtering may be performed to limit the clusters for visual analysis (if desired) to messages that were delivered, had more than a number of attachments, were sent from more than a number of different header domains or sender domains, had more than a number of different recipients (in the same email or across multiple emails), and/or had more than a number of different subjects. The results may then be analyzed, and mitigation efforts may be commenced. Machine learning and pattern recognition may be utilized to provide ongoing optimization and automation.

In some arrangements, an information-security process for detecting malicious email campaigns based on attachment filename similarity may comprise the steps of: retrieving, by an information-security computer (ISC) from a data source, a log that identifies: message identifiers (IDs), timestamps, message delivery data status, and filenames of attached files; filtering, by the ISC, the log for messages to be analyzed; normalizing, by the ISC, the log to remove inapplicable characters in the filenames of the attached files and/or log files' field names; excluding, by the ISC from the filenames of the attached files in the log, irrelevant files; generating, by the ISC from the log, an organized dataset with fields; multi-value expanding, by the ISC, the organized dataset to split fields with multiple values into separate data entries; cluster analyzing, by the ISC, the separate data entries in the organized dataset into clustered data; transforming, by the ISC from the clustered data, the filenames of the attached files into numerical vectors; measuring, by the ISC, cosine similarity for the clustered data based on numerical similarity of the numerical vectors for the filenames; identifying, by the ISC, clustered excerpts in the clustered data exceeding a cosine similarity threshold; organizing, by the ISC, said clustered excerpts into time bins for burst detection; statistically analyzing, by the ISC, said clustered excerpts in the time bins to obtain, for messages that were delivered, the message IDs and the filenames of the attached files; and pattern recognizing, by the ISC, alphanumeric similarities in the filenames of the attached files to detect said malicious email campaigns.

In some arrangements, an information-security process for detecting malicious email campaigns based on attachment file name similarity may comprise the steps of: retrieving, by an information-security computer (ISC) from a data source, a log that identifies: message identifiers (IDs), timestamps, message delivery data status, header domains, sender domains, subjects of the messages, recipients of the messages, and filenames of attached files; filtering, by the ISC, the log for messages that were delivered; normalizing, by the ISC, the log to remove inapplicable characters in the filenames of the attached files and/or log files' field names; excluding, by the ISC from the filenames of the attached files in the log, irrelevant files including attachments named "text.html" or "text.txt"; generating, by the ISC from the log, an organized dataset with fields; multi-value expanding, by the ISC, the organized dataset to split fields with multiple values into separate data entries; cluster analyzing, by the ISC, the separate data entries in the organized dataset into clustered data; transforming, by the ISC from the clustered data, the filenames of the attached files into numerical vectors; measuring, by the ISC, cosine termset similarity for the clustered data based on numerical similarity of the numerical vectors for the filenames; identifying, by the ISC, clustered excerpts in the clustered data exceeding a cosine-termset similarity threshold of at least 60%; organizing, by the ISC, said clustered excerpts into one-hour time bins for burst detection; statistically analyzing, by the ISC, said clustered excerpts in the time bins to obtain, for messages that were delivered, the message IDs and the filenames of the attached files; pattern recognizing, by the ISC, alphanumeric similarities in the filenames of the attached files to detect said malicious email campaigns; removing, by the ISC from recipient mailboxes, the messages that were part of the malicious email campaigns; and providing, by the ISC, at least one notification for the malicious email campaigns that were detected.

In some arrangements, an information-security process for detecting malicious email campaigns based on attachment file name similarity may comprise the steps of: retrieving, by an information-security computer (ISC) from a data source, a log that identifies: message identifiers (IDs), timestamps, message delivery data status, header domains, sender domains, subjects of the messages, recipients of the messages, and filenames of attached files; filtering, by the ISC, the log for messages that were delivered; normalizing, by the ISC, the log to remove inapplicable characters in the filenames of the attached files and/or log files' field names; excluding, by the ISC from the filenames of the attached files in the log, irrelevant files including attachments named "text.html" or "text.txt"; generating, by the ISC from the log, an organized dataset with fields; multi-value expanding, by the ISC, the organized dataset to split fields with multiple values into separate data entries; cluster analyzing, by the ISC, the separate data entries in the organized dataset into clustered data; transforming, by the ISC from termset data in the clustered data, the filenames of the attached files into numerical vectors; measuring, by the ISC, cosine termset similarity for the clustered data based on numerical similarity of the numerical vectors for the filenames; identifying, by the ISC, clustered excerpts in the clustered data exceeding a cosine-termset similarity threshold of at least 60%; organizing, by the ISC, said clustered excerpts into one-hour time bins for burst detection; statistically analyzing, by the ISC, said clustered excerpts in the time bins to obtain, for messages that were delivered, the message IDs and the filenames of the attached files; pattern recognizing, by the ISC, alphanumeric similarities in the filenames of the attached files to detect said malicious email campaigns; and removing, by the ISC from recipient mailboxes, the messages that were part of the malicious email campaigns in real-time; optimizing, by the ISC based on machine learning from the alphanumeric similarities in the filenames of the attached files, the cosine-termset similarity threshold; and providing, by the ISC, at least one notification for the malicious email campaigns that were detected.

In some arrangements, one or more various steps of processes disclosed herein can be implemented in whole or in part as computer-executable instructions stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 4 depicts a functional flow diagram showing sample steps, functions, and processing in accordance with one or more information-security aspects of this disclosure as they relate to detecting malicious email campaigns with unique but similarly spelled attachments.

FIGS. 5A and 5B depict sample processing outputs that can be used to recognize, inter alia, similarly spelled attachments in clusters in accordance with one or more information-security aspects of this disclosure.

DETAILED DESCRIPTION

Figure 1:
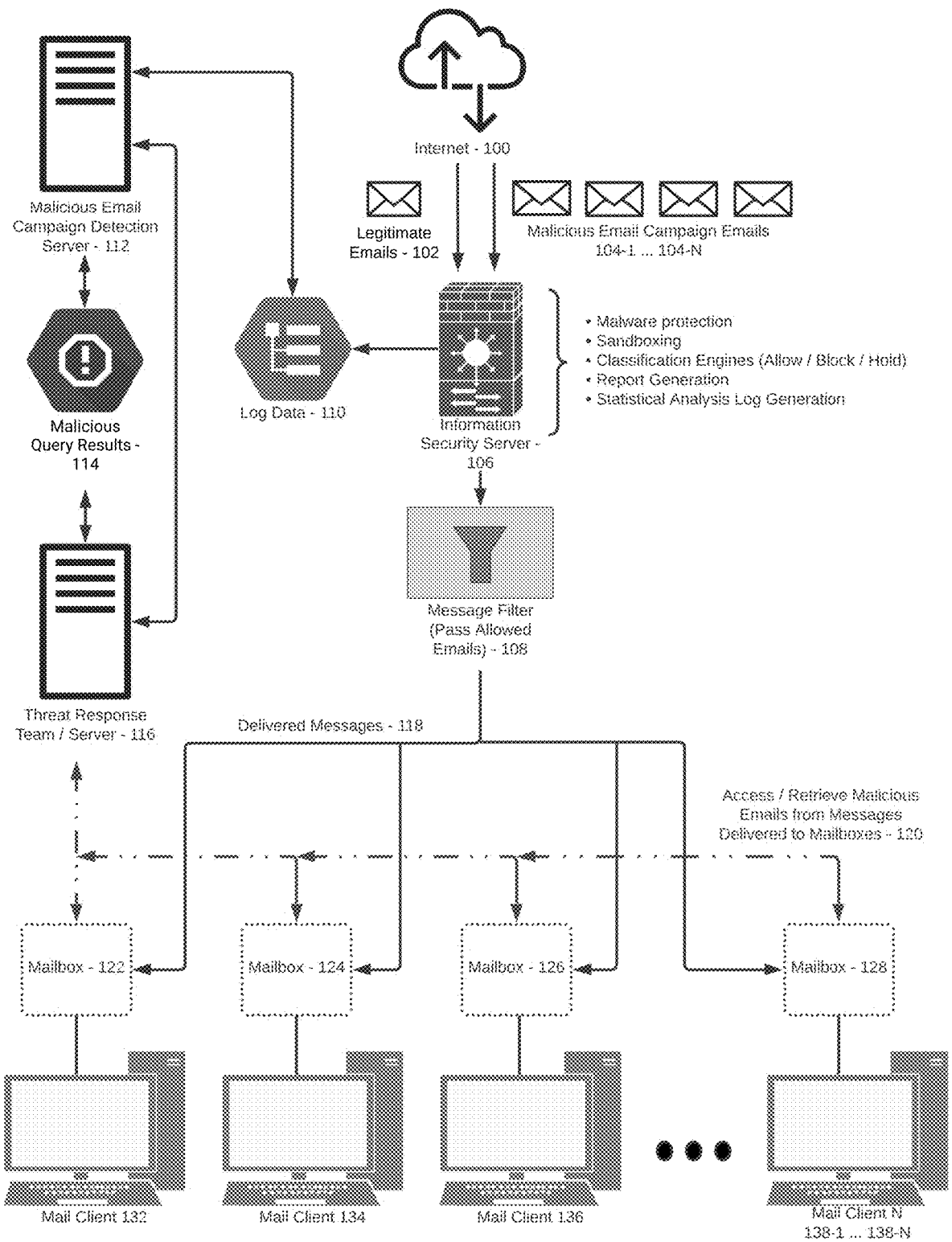
FIGS. 1-3 depict an architectural and functional flow diagrams showing sample interactions, interfaces, steps, functions, and components in accordance with one or more information-security aspects of this disclosure as they relate to detecting malicious email campaigns that have unique but similarly spelled attachments.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

Figure 2:
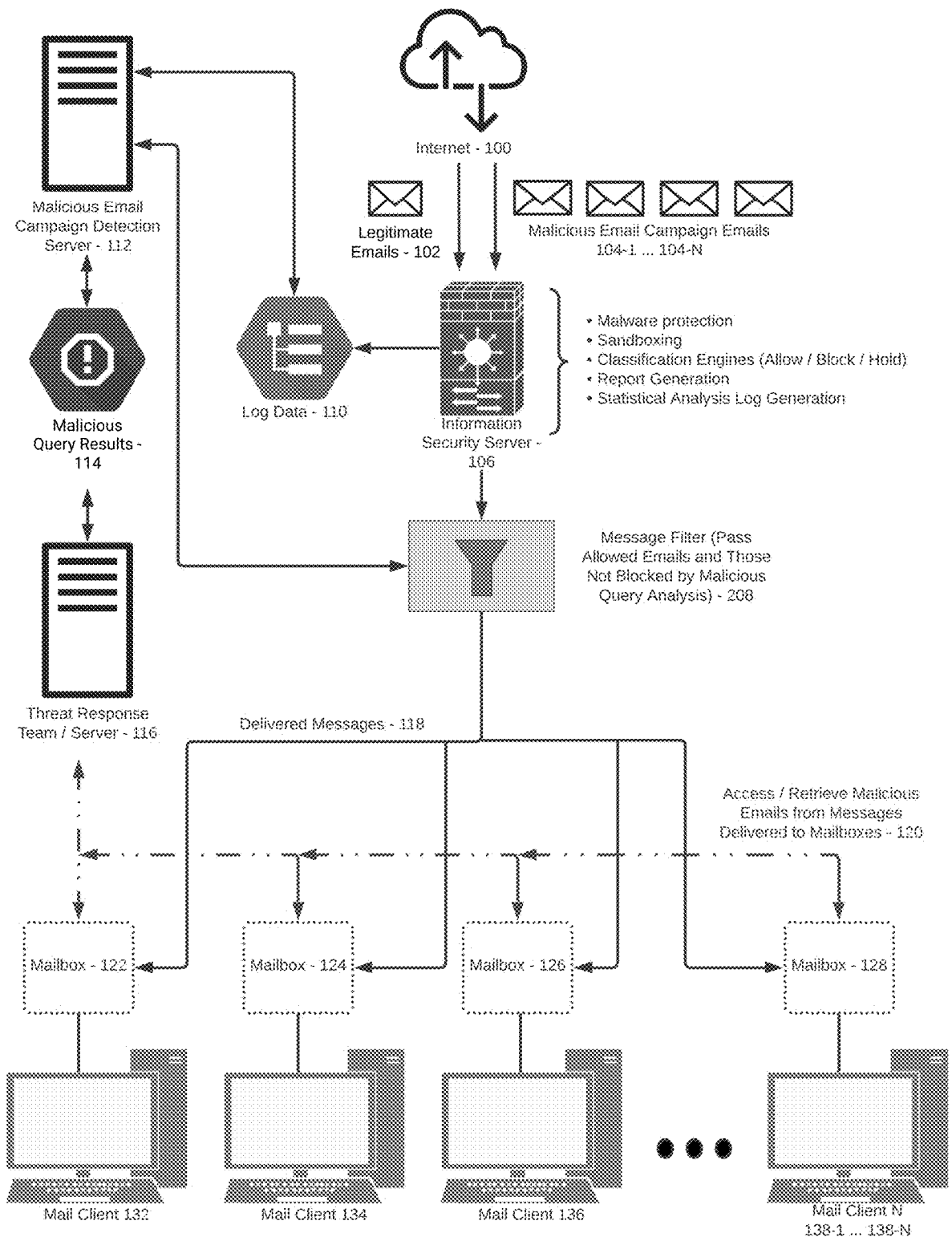
Figure 3:
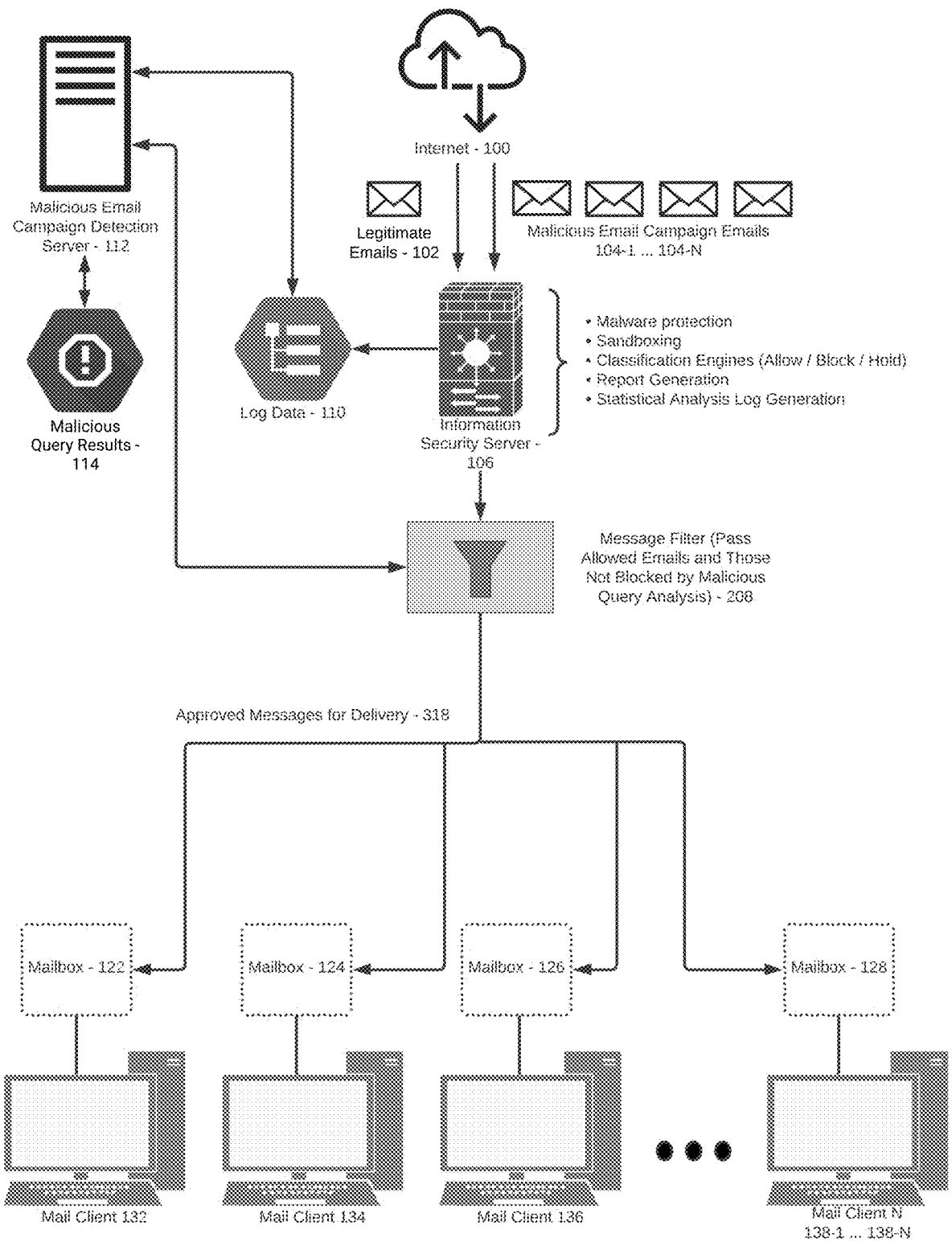

By way of non-limiting disclosure, FIGS. 1-3 depict an architectural and functional flow diagram showing sample interactions, interfaces, steps, functions, and components in accordance with one or more information-security aspects of this disclosure as they relate to detecting malicious email campaigns with unique but similarly spelled attachments.

In FIG. 1, legitimate emails 102 and malicious emails 104-1 . . . 104-N that are part of malware attack campaigns are received over the Internet 100. Enterprise cybersecurity solutions, such as those from Proofpoint and others, can attempt to provide email security. This can be implemented on vendor-provided hardware or as software protection as part of one or more information security servers/computers (ISC) 106, which can standalone or be part of a distributed architecture and provide, inter alia, malware protection, sandboxing, classification engines to determine whether to allow/block/hold incoming email traffic, generate reports, perform statistical analyses, and generate email logs. ISC 106 may also function as an email server or provide other network or server functionality depending on load balancing and other network architecture considerations.

Based on classification engines in ISC 106 or the like, emails may be filtered 108 such that only emails marked as "allowed" by the classification engine are allowed to pass. "Allowed" emails then may be delivered 118 to recipients' mailboxes 122, 124, 126, 128 on corresponding user computers via mail clients 132, 134, 136, 138-1 . . . 138-N.

Email log data 110 may be extracted from, stored by, accessible from, or utilized by ISC 106. The log data 110 is the primary data from which the malicious email campaign can be detected.

Malicious email campaign detection server 112 can be used to extract, normalize, transform, analyze, etc. data from log 110. Alternatively, these functions may be implemented in ISC 106. For the purposes of this disclosure, the functionality of this disclosure and the various arrangements may be implemented on a single server/computer, on separate servers/computers, and/or in a distributed manner. the servers/computers. As such malicious email campaign detection server 112 may be designated as such in this specification, but it should be understood that its functionality may be implemented in any ISC or other server. Accordingly, the terms should be considered interchangeable since the applicable functionality of the disclosure is implemented preferably as computer-executable instructions on a computer or server.

Malicious email campaign detection server 112 can query and process data in log 110. The malicious query results 114 may be stored locally or on network accessible storage, and threat response teams or servers 116 can be provided with the results 114 or otherwise alerted to any detected malware campaigns.

A threat response team/server 116 can then retrieve and remove proactively 120 malicious emails from all mailboxes 122, 124, 126, 128-1 . . . 128-N, etc. that received the malware email. This may prevent the user from ever opening the email or attachment(s) thereto. This functionality may also be implemented in ISC 106 or the like, if desired. The point is that this functionality is implemented, and it does not necessarily matter whether it is executed on ISC 106, server 112, or server 116. As such, these computers/servers may be considered interchangeable in the various arrangements discussed herein.

In some arrangements, the query-related processing, cosine-similarity, statistical-analysis, pattern-recognition, and/or machine-learning functionality performed by malicious email campaign detection server 112 may be implemented, for example, in Splunk Programming Language (SPL) commands that are operating on log data 110 from, for example, a Proofpoint index and source type. The "source" for the query can be "messages/delivered" or "messages/blocked" and can exclude irrelevant terms such as message-delivery status, which would be present in every email in the log. MessageParts{ } can be renamed to remove inapplicable or unusable filename characters. An eval function may be performed to remove files named "text.html" or "text.txt," because they appear in every email message. Additionally, image files matching the regular expression "image\d*\.png" (i.e., files starting with image, having some number(s), and then ending in a .png file extension suffix) can be excluded because they appear very frequently and usually do not indicate any type of malicious activity. This helps streamline the data to be analyzed and removes file attachments that would trigger false positives. Additional and/or other files and filetypes may be removed as well, as desired.

A "table" command may be used to create organized data with field information that is relevant to the detection and analysis process. The table command may designate fields for use and analysis to include: time/date bins, file attachment names, the email message IDs, header domains, sender domains, recipients of the emails, email subjects, sources, etc. This corresponds to a "table" command that could be SPL programmed as "_time file x header_from_domain sender_domain recipient{ } subject source message_id."

A multi-value expansion (e.g., mvexpand) can be performed on the "email attachment filename" field in the organized data to separate values of the multi-value field into separate events, one event for each value in the multi-value field. Stated differently, this would modify the organized data so that emails with multiple attachments can be differentiated into different row entries in the organized data.

Cluster analysis can then be performed on the email-attachment filename field. This can preferably show the counts of various fields and focus on the filename attachment field to perform a cosine similarity analysis to identify unique but similarly named attachments. This could take the SPL form of "cluster showcount=t field=file labelonly=t t=0.6". In this example, the t=0.6 would indicate a cosine similarity threshold of 60%.

This cosine similarity termset analysis is performed by transforming attachment "filenames" into numerical vectors and then identifying the intersection of those vectors. In data analysis, cosine similarity is essentially a measure of similarity between two non-zero vectors (i.e., filenames numerically transformed) that are defined in an inner product space. Cosine similarity is the cosine of the angle between the vectors; that is, it is the dot product of the vectors divided by the product of their lengths.

The resulting clusters can then be searched to identify groupings to be analyzed. For example, the clusters could be searched to identify those with a cluster count of more than 10 (e.g., SPL "search cluster_count>10"). This is relevant since the goal is to identify malicious campaigns, which would necessarily involve sending many emails to one or more recipients (likely many recipients). Hence this search would identify how many similarly named files are in each cluster.

The organized data may be grouped into bins (i.e., buckets) of time in order to detect bursts that happen with an applicable time frame. For example, SPL "bin span=1h_time" will group data into one-hour intervals over the applicable time frame (e.g., hours, days, and/or months).

A statistical analysis can be executed on the data and be fed functions in order to identify, for example, maximum cluster counts and aggregate those by time values (e.g., 1 hour) and cluster labels to ensure that each cluster contains similar file attachment names. This helps identify if the attack has stopped or is ongoing. Counts may be performed on source types (e.g., blocked messages, delivered messages, etc.). Distinct counts (SPL "dc") can be performed on message IDs, attachment file names, header domains, sender domains, recipients, subjects, etc.

A search can then be performed to filter (i.e., identify), for example, the number of delivered emails that had various thresholds of attached files, different header domains or sender domains, recipients, and subjects. For example, an SPL search of "delivered>0 dc_attachments>5 (dc_header_from_domain>5 OR dc_sender_domain>5) dc_recipient>5 dc_subject>5" would search for delivered emails that had more than five variations of attachment filenames, and more than five different originating header or sender domains, and were sent to more than five recipients, and have more than five subjects. This provides higher fidelity to identify malicious behavior.

Thereafter data may be cleaned up or tailored for the potential audience that will review the applicable type of results. For example, cluster labels and cluster counts may be removed from the organized data due to the fact that it may be irrelevant to certain people. This can be implemented in SPL as "fields-cluster*".

If desired, the number of sample attachments (delivered or blocked) under analysis can be limited. This can truncate a list of attachment filenames, for example, to some limiting number such as five. This is helpful depending on the person or people who will be reviewing the data, especially if the results are being sent via email. An excessive number of filenames can make the information more difficult to understand (e.g., especially if the info is being transmitted in the body of an email to one or more individuals for their review), whereas five or so examples may be sufficient for explanation purposes to identify the patterns of attachment filenames. The organized data results can further be sorted if desired such as, for example, by delivered emails (which are most important because they made it through the email cybersecurity filtering) or blocked emails (which the cybersecurity was able to catch).

FIG. 2 differs from the prior figure in that, in this arrangement, real-time or fast filtering of data may be fed into filter 208 such that the message filter only passes "allowed" emails that were not flagged by server 112 as being part of malicious email campaign detection. However, other mitigation as describe supra can be performed if emails were delivered before the campaign was detected.

FIG. 3 differs from the prior figures in that, in this arrangement, filter 208 is able to successfully detect malicious campaigns such that subsequent removal of malicious emails from recipient mailboxes is unnecessary because they will have already been caught and the threat was avoided. As such, only approved messages will have been delivered 308.

FIG. 4 depicts depict a functional flow diagram showing sample steps, functions, and processing in accordance with one or more information-security aspects of this disclosure as they relate to detecting malicious email campaigns with unique but similarly spelled attachments.

In 400, a malicious campaign detection query can be initiated. An index and sourcetype for log(s) to search can be selected in 402. Types of messages to be analyzed (e.g., messages/delivered and/or messages/blocked and not message-delivery-status) can be screened in 404, and the results may be passed forward in 406. Message parts can be renamed to remove inapplicable characters and/or log files' fields from names of files attached to emails in 408 and the dataset with corrected or normalized filenames and/or log files' field names can be forwarded in 410.

In 412, file attachments of inapplicable files or file types (e.g., "text.html", "text.txt", "image*.png", etc.) can be excluded and the resulting dataset may be passed forward in 413.

Organized data can be created in 414 by generation of a table with specified fields (e.g., SPL "table_time file x header_from_domain sender_domain recipient{ } subject source message_id"). In 415, multi-value "file" field entries can be expanded into separate rows for each value in the multi-value field (e.g., split log entries having multiple attached files so that each row only has one attached file).

A cluster analysis can be performed in 416, in which a focus on the filename field is selected, and a cosine similarity termset analysis is performed like described supra. A cosine threshold may be specified (e.g., 60%) and query settings can be imposed, such as to add cluster number and label to all table rows.

A search for clusters that have a count exceeding a count threshold in order to identify the number of files in each cluster (e.g., only clusters of at least 10 similarly named files) can be performed in 418. And a time frame to detect bursts (e.g., 1 hour buckets) can be designated in 420.

A statistical analysis based on function outputs can be implemented in 422. This could determine maximum cluster counts, perform counts on blocked and delivered messages, perform distinct counts on message IDs and file attachments, obtain lists of delivered and/or blocked attachments, perform distinct counts on header_from_domain, sender_domain, recipient, subject, and message IDs, obtain lists of message IDs, and separate results by time and cluster label.

A search of the delivered emails for those that match search criteria thresholds (e.g., for attachments, header_from_domain, sender_domain, recipients, subjects, etc.) can be performed in 424. Optionally, any unnecessary fields can be removed from the cluster in 426.

For ease of $3^{rd}$ party or the like review, the filename multi-value list can be truncated in 428 to limit the number of table entries for desired fields (e.g., max number of delivered attachments, max number of blocked attachments, and max number of message ids). The results may be sorted (e.g., by delivered emails and then by blocked emails) in 430 and the results may be stored in 432.

In 434 (or in separate steps or modules), functionality related to pattern recognition, machine learning, result analysis, etc. can be implemented.

Pattern recognition on attachment filenames can be automated and optimized depending on the applicable cosine similarity threshold being used. This can automate and expedite the review process such that manual recognition of filename formats of, for example, "wp# . . . html" (as shown below in FIG. 5B) are unnecessary and the process can then be performed in real-time or in a fast manner.

Additionally, machine learning may be used to monitor the query process over applicable periods of time and in an ongoing manner in order to optimize variables in the query to provide a higher fidelity view into malicious campaigns and to increase the accuracy of flagged attachment filenames. One way in which this may be implemented is to tailor the cosine threshold (or other variables) based on the observed results and the emails (or attachment filenames) that are flagged as malicious. This machine learning may take the form of supervised or semi-supervised learning. Artificial intelligence or neural networks may be used as well to provide further or alternative optimization.

Notifications may be provided (automatically or manually) to threat response teams, recipients, or other interested individuals as desired in 436.

Threat mitigation may commence as fast as possible in 438. This may take the form of automatically (or manually) removing and/or potentially deleting from user mailboxes the malicious emails that were identified after having already been passed from a cybersecurity filter and delivered to the recipients. Additionally, or alternatively, the mitigation may take the form of updating the cybersecurity filters for the future such the process is intelligent and can machine learn from the past malicious campaigns. Thereafter, the process may conclude in 440 or repeat, or may continuously be executed.

FIGS. 5A and 5B depict sample processing outputs that can be used to recognize, inter alia, similarly spelled attachments in clusters in accordance with one or more information-security aspects of this disclosure.

Organized data is represented as a table 500 in FIG. 5A. The table can include various fields such as, for example, one or more of those depicted in FIG. 5A. Additional or alternative fields could be used as well. In this example, the depicted fields include: time bin 502, the number of delivered emails 504, the number of blocked emails 506, the distinct count of file attachments 508, the sample delivered attachments 510, the sample blocked attachments 512, the distinct counts of header from domains 514 and sender domains 516, the distinct count of recipients 518, the distinct count of subjects 520, the distinct count of message IDs 522, and the message IDs themselves 524. Various fields may be truncated as desired in accordance with the discussions supra.

FIG. 5B is an excerpt of FIG. 5A and shows the fields of date/time bins and the attachment names. This shows a malicious email campaign that was detected. In this example, the attachments all had the same initial portion of the filename, which is "wp#" 510-1 and the same file extension type of "html" 510-2.

Figure 6:
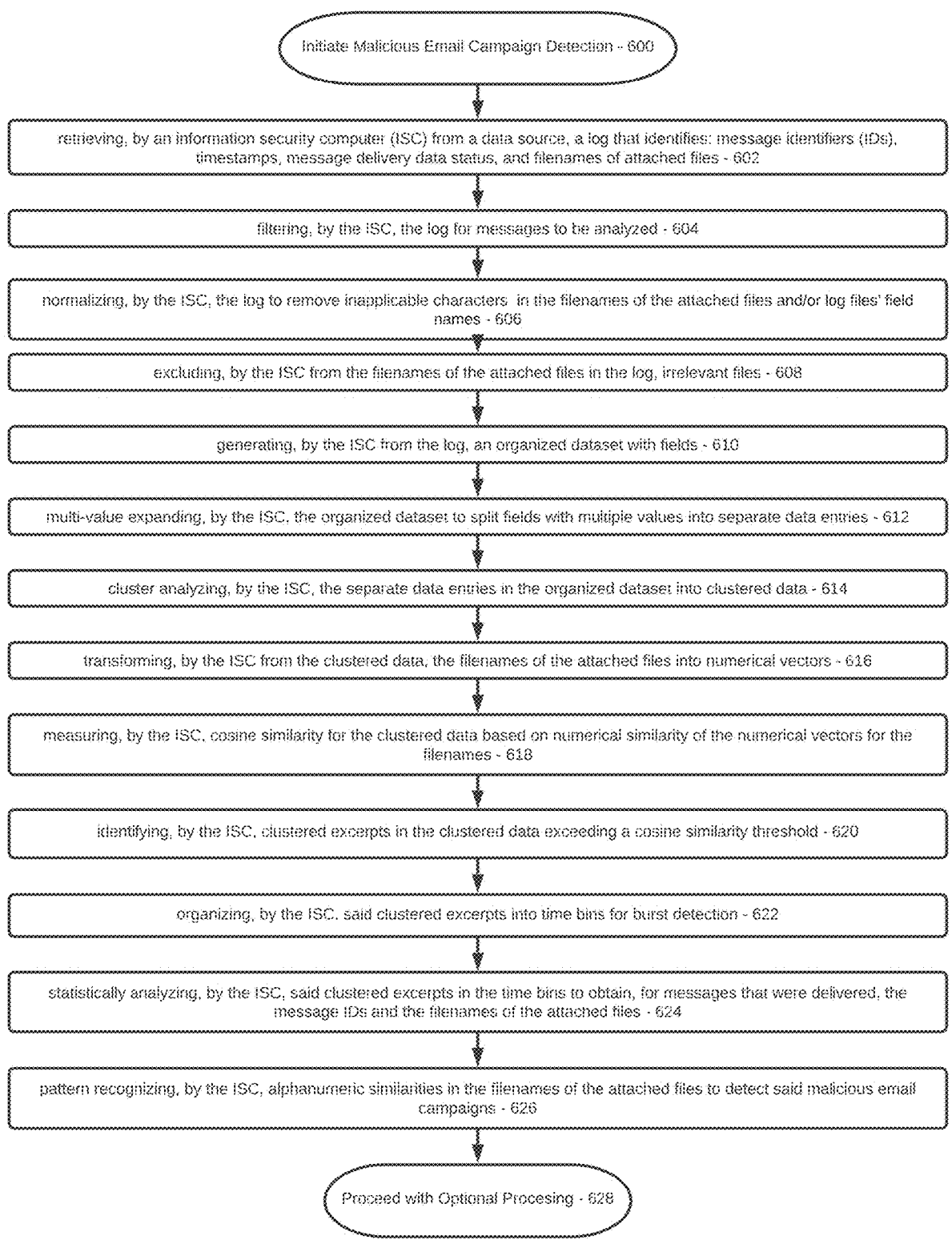
FIGS. 6-8 depict functional flow diagrams showing sample steps, functions, and processing in accordance with one or more information-security aspects of this disclosure as they relate to detecting malicious email campaigns with unique but similarly spelled attachments.
Figure 7:
Figure 8:
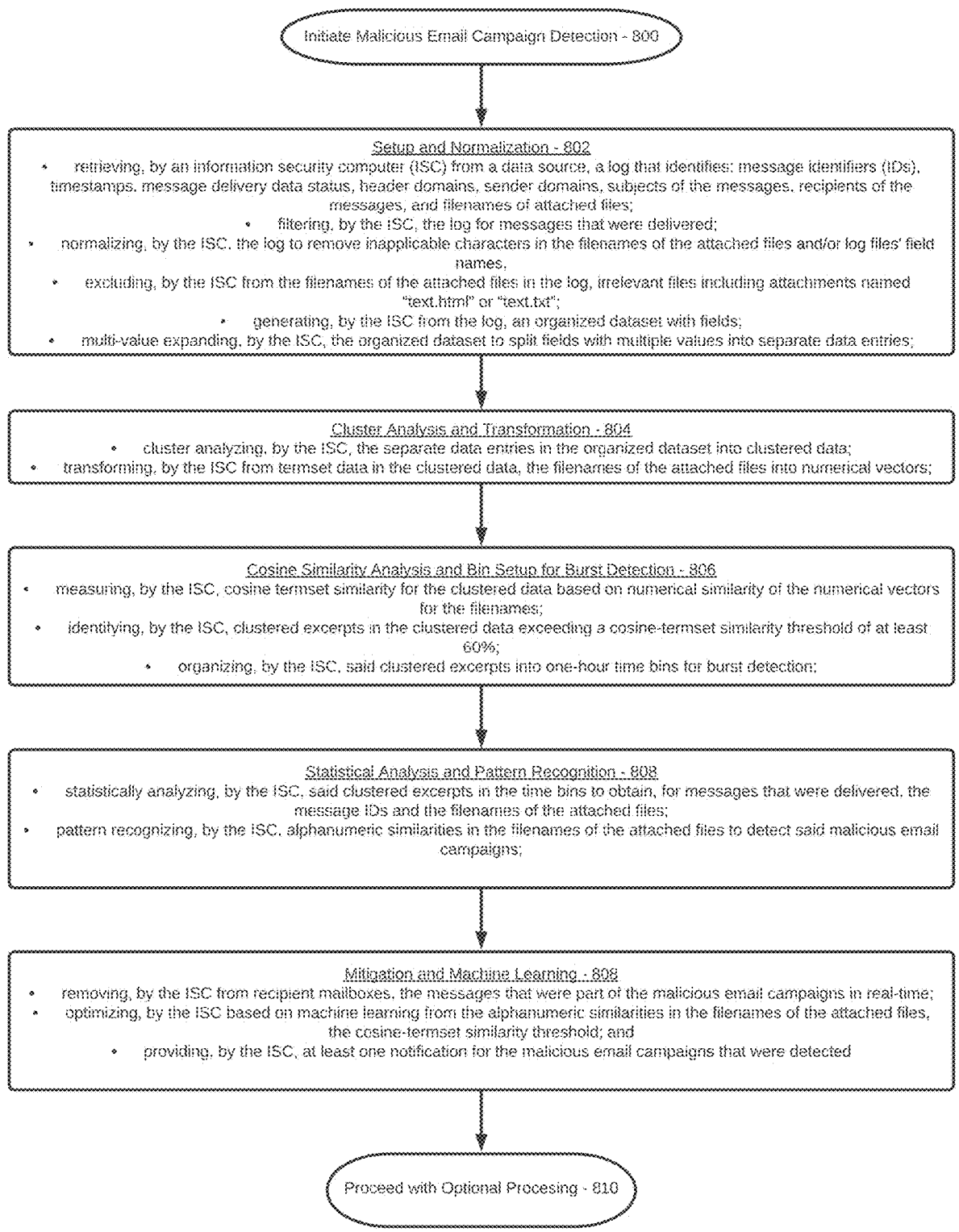

FIGS. 6-8 depict functional flow diagrams showing sample steps, functions, and processing in accordance with one or more information-security aspects of this disclosure as they relate to detecting malicious email campaigns with unique but similarly spelled attachments.

In the sample arrangement of FIG. 6, an information-security process for detecting malicious email campaigns based on attachment file name similarity 600 comprises various computing steps. Retrieving, by an information-security computer (ISC) from a data source, a log that identifies: message identifiers (IDs), timestamps, message delivery data status, and filenames of attached files is performed in 602. Filtering, by the ISC, and the log for messages to be analyzed is performed in 604. Normalizing, by the ISC, the log to remove inapplicable characters in the filenames of the attached files and/or log files' field names is executed in 606. Excluding, by the ISC from the filenames of the attached files in the log, irrelevant files can be implemented in 608. Generating, by the ISC from the log, an organized dataset with fields can be performed in 610 and multi-value expanding, by the ISC, the organized dataset to split fields with multiple values into separate data entries can be performed in 612.

Cluster analyzing, by the ISC, the separate data entries in the organized dataset into clustered data can be executed in 614. Transforming, by the ISC from the clustered data, the filenames of the attached files into numerical vectors can be converted in 616. Measuring, by the ISC, cosine similarity for the clustered data based on numerical similarity of the numerical vectors for the filenames can be calculated in 618. Identifying, by the ISC, clustered excerpts in the clustered data exceeding a cosine similarity threshold is in 620. Organizing, by the ISC, said clustered excerpts into time bins for burst detection is performed in 622. Statistically analyzing, by the ISC, said clustered excerpts in the time bins to obtain, for messages that were delivered, the message IDs and the filenames of the attached files is in 624. And pattern recognizing, by the ISC, alphanumeric similarities in the filenames of the attached files to detect said malicious email campaigns is in 626.

In FIG. 7, another sample information-security process 700 for detecting malicious email campaigns based on attachment file name similarity is depicted. In 702, retrieving, by an information-security computer (ISC) from a data source, a log that identifies: message identifiers (IDs), timestamps, message delivery data status, header domains, sender domains, subjects of the messages, recipients of the messages, and filenames of attached files is performed. 704 is filtering, by the ISC, the log for messages that were delivered. 706 is normalizing, by the ISC, the log to remove inapplicable characters in the filenames of the attached files and/or log files' field names. 708 is excluding, by the ISC from the filenames of the attached files in the log, irrelevant files including attachments named "text.html" or "text.txt". 710 is generating, by the ISC from the log, an organized dataset with fields. 712 is multi-value expanding, by the ISC, the organized dataset to split fields with multiple values into separate data entries.

In 714, the cluster analyzing, by the ISC, the separate data entries in the organized dataset into clustered data is performed. 716 is transforming, by the ISC from the clustered data, the filenames of the attached files into numerical vectors. 718 is measuring, by the ISC, cosine termset similarity for the clustered data based on numerical similarity of the numerical vectors for the filenames. 720 is identifying, by the ISC, clustered excerpts in the clustered data exceeding a cosine-termset similarity threshold of at least 60%. 722 is organizing, by the ISC, said clustered excerpts into one-hour time bins for burst detection. 724 is statistically analyzing, by the ISC, said clustered excerpts in the time bins to obtain, for messages that were delivered, the message IDs and the filenames of the attached files. 726 is pattern recognizing, by the ISC, alphanumeric similarities in the filenames of the attached files to detect said malicious email campaigns. 728 is removing, by the ISC from recipient mailboxes, the messages that were part of the malicious email campaigns. And 730 is providing, by the ISC, at least one notification for the malicious email campaigns that were detected.

In FIG. 8, another sample information-security process 800 for detecting malicious email campaigns based on attachment file name similarity is illustrated. In 802, setup and normalization is performed. This includes retrieving, by an information-security computer (ISC) from a data source, a log that identifies: message identifiers (IDs), timestamps, message delivery data status, header domains, sender domains, subjects of the messages, recipients of the messages, and filenames of attached files; filtering, by the ISC, the log for messages that were delivered; normalizing, by the ISC, the log to remove inapplicable characters in the filenames of the attached files and/or log files' field names; excluding, by the ISC from the filenames of the attached files in the log, irrelevant files including attachments named "text.html" or "text.txt"; generating, by the ISC from the log, an organized dataset with fields; and multi-value expanding, by the ISC, the organized dataset to split fields with multiple values into separate data entries.

In 804 cluster analysis and transformation is implemented. This includes cluster analyzing, by the ISC, the separate data entries in the organized dataset into clustered data; and transforming, by the ISC from termset data in the clustered data, the filenames of the attached files into numerical vectors.

Cosine similarity analysis and bin setup for burst detection is executed in 806. This includes measuring, by the ISC, cosine termset similarity for the clustered data based on numerical similarity of the numerical vectors for the filenames; identifying, by the ISC, clustered excerpts in the clustered data exceeding a cosine-termset similarity threshold of at least 60%; and organizing, by the ISC, said clustered excerpts into one-hour time bins for burst detection.

Statistical analysis and pattern recognition can be performed in 808. This includes statistically analyzing, by the ISC, said clustered excerpts in the time bins to obtain, for messages that were delivered, the message IDs and the filenames of the attached files; and pattern recognizing, by the ISC, alphanumeric similarities in the filenames of the attached files to detect said malicious email campaigns.

Mitigation and machine learning are in 810. This includes removing, by the ISC from recipient mailboxes, the messages that were part of the malicious email campaigns in real-time; and optimizing, by the ISC based on machine learning from the alphanumeric similarities in the filenames of the attached files, the cosine-termset similarity threshold. Notifications providing, by the ISC, at least one notification for the malicious email campaigns that were detected, can also be generated and transmitted.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An information-security process for detecting malicious email campaigns based on attachment file name similarity comprising the steps of:
    retrieving, by an information-security computer (ISC) from a data source, a log that identifies: message identifiers (IDs), timestamps, message delivery data status, and filenames of attached files;
    filtering, by the ISC, the log for messages to be analyzed;
    normalizing, by the ISC, the log to remove inapplicable characters in the filenames of the attached files and/or log files' field names;
    excluding, by the ISC from the filenames of the attached files in the log, irrelevant files;
    generating, by the ISC from the log, an organized dataset with fields;
    multi-value expanding, by the ISC, the organized dataset to split fields with multiple values into separate data entries;
    cluster analyzing, by the ISC, the separate data entries in the organized dataset into clustered data;
    transforming, by the ISC from the clustered data, the filenames of the attached files into numerical vectors;
    measuring, by the ISC, cosine similarity for the clustered data based on numerical similarity of the numerical vectors for the filenames;
    identifying, by the ISC, clustered excerpts in the clustered data exceeding a cosine similarity threshold;
    organizing, by the ISC, said clustered excerpts into time bins for burst detection;
    statistically analyzing, by the ISC, said clustered excerpts in the time bins to obtain, for messages that were delivered, the message IDs and the filenames of the attached files; and
    pattern recognizing, by the ISC, alphanumeric similarities in the filenames of the attached files to detect said malicious email campaigns.

2. The information-security process of claim 1 further comprising the step of: removing, by the ISC from recipient mailboxes, the messages that were part of the malicious email campaigns.

3. The information-security process of claim 1 further comprising the step of: removing, by the ISC from recipient mailboxes in real-time as soon as any of said malicious email campaigns are detected, the messages that were part of the malicious email campaigns.

4. The information-security process of claim 2 wherein the irrelevant files include "text.html" or "text.txt" filenames.

5. The information-security process of claim 3 wherein the irrelevant files include irrelevant filenames starting with "image" and ending with ".png".

6. The information-security process of claim 4 wherein the cosine similarity threshold is initially set to be at least 60%.

7. The information-security process of claim 5 wherein the log further contains domain information.

8. The information-security process of claim 6 wherein the statistically analyzing step further comprises sub-steps of:
    determining, by the ISC, maximum cluster counts in the clustered excerpts;
    performing, by the ISC, blocked counts on blocked messages in the clustered excerpts;
    performing, by the ISC, delivered counts on delivered messages based on message delivery data status in the clustered excerpts;
    performing, by the ISC, first distinct counts on said message IDs in the clustered excerpts;
    performing, by the ISC, second distinct counts on the file attachments in the clustered excerpts;
    performing, by the ISC, third distinct counts on the domain information in the clustered excerpts;
    perform, by the ISC, fourth distinct counts subjects in the clustered excerpts; and
    performing, by the ISC, fifth distinct counts on recipients in the clustered excerpts.

9. The information-security process of claim 7 wherein the domain information includes sender domains and header domains.

10. The information-security process of claim 8 further comprising the step of generating, by the ISC, a notification for the malicious email campaigns that were detected.

11. The information-security process of claim 10 further comprising the step of: optimizing, by the ISC based on machine learning from the alphanumeric similarities in the filenames of the attached files, the cosine similarity threshold.

12. The information-security process of claim 11 wherein the machine learning is supervised.

13. The information-security process of claim 11 wherein the machine learning is semi-supervised.

14. An information-security process for detecting malicious email campaigns based on attachment file name similarity comprising the steps of:
    retrieving, by an information-security computer (ISC) from a data source, a log that identifies: message identifiers (IDs), timestamps, message delivery data status, header domains, sender domains, subjects of the messages, recipients of the messages, and filenames of attached files;
    filtering, by the ISC, the log for messages that were delivered;
    normalizing, by the ISC, the log to remove inapplicable characters in the filenames of the attached files and/or log files' field names;
    excluding, by the ISC from the filenames of the attached files in the log, irrelevant files including attachments named "text.html" or "text.txt";
    generating, by the ISC from the log, an organized dataset with fields;

multi-value expanding, by the ISC, the organized dataset to split fields with multiple values into separate data entries;

cluster analyzing, by the ISC, the separate data entries in the organized dataset into clustered data;

transforming, by the ISC from the clustered data, the filenames of the attached files into numerical vectors;

measuring, by the ISC, cosine termset similarity for the clustered data based on numerical similarity of the numerical vectors for the filenames;

identifying, by the ISC, clustered excerpts in the clustered data exceeding a cosine-termset similarity threshold of at least 60%;

organizing, by the ISC, said clustered excerpts into one-hour time bins for burst detection;

statistically analyzing, by the ISC, said clustered excerpts in the time bins to obtain, for messages that were delivered, the message IDs and the filenames of the attached files;

pattern recognizing, by the ISC, alphanumeric similarities in the filenames of the attached files to detect said malicious email campaigns;

removing, by the ISC from recipient mailboxes, the messages that were part of the malicious email campaigns; and providing, by the ISC, at least one notification for the malicious email campaigns that were detected.

15. The information-security process of claim 14 wherein the messages that were part of the malicious email campaigns are removed in real-time.

16. The information-security process of claim 15 further comprising the step of: optimizing, by the ISC based on machine learning from the alphanumeric similarities in the filenames of the attached files, the cosine similarity threshold.

17. The information-security process of claim 16 wherein the machine learning is supervised.

18. The information-security process of claim 16 wherein the machine learning is semi-supervised.

19. The information-security process of claim 16 wherein the statistically analyzing step further comprises sub-steps of:

determining, by the ISC, maximum cluster counts in the clustered excerpts;

performing, by the ISC, blocked counts on blocked messages in the clustered excerpts;

performing, by the ISC, delivered counts on delivered messages based on message delivery data status in the clustered excerpts;

performing, by the ISC, first distinct counts on said message IDs in the clustered excerpts;

performing, by the ISC, second distinct counts on the file attachments in the clustered excerpts;

performing, by the ISC, third distinct counts on the domain information in the clustered excerpts;

perform, by the ISC, fourth distinct counts subjects in the clustered excerpts; and performing, by the ISC, fifth distinct counts on recipients in the clustered excerpts.

20. An information-security process for detecting malicious email campaigns based on attachment file name similarity comprising the steps of:

retrieving, by an information-security computer (ISC) from a data source, a log that identifies: message identifiers (IDs), timestamps, message delivery data status, header domains, sender domains, subjects of the messages, recipients of the messages, and filenames of attached files;

filtering, by the ISC, the log for messages that were delivered;

normalizing, by the ISC, the log to remove inapplicable characters in the filenames of the attached files and/or log files' field names;

excluding, by the ISC from the filenames of the attached files in the log, irrelevant files including attachments named "text.html" or "text.txt";

generating, by the ISC from the log, an organized dataset with fields;

multi-value expanding, by the ISC, the organized dataset to split fields with multiple values into separate data entries;

cluster analyzing, by the ISC, the separate data entries in the organized dataset into clustered data;

transforming, by the ISC from termset data in the clustered data, the filenames of the attached files into numerical vectors;

measuring, by the ISC, cosine termset similarity for the clustered data based on numerical similarity of the numerical vectors for the filenames;

identifying, by the ISC, clustered excerpts in the clustered data exceeding a cosine-termset similarity threshold of at least 60%;

organizing, by the ISC, said clustered excerpts into one-hour time bins for burst detection;

statistically analyzing, by the ISC, said clustered excerpts in the time bins to obtain, for messages that were delivered, the message IDs and the filenames of the attached files;

pattern recognizing, by the ISC, alphanumeric similarities in the filenames of the attached files to detect said malicious email campaigns;

removing, by the ISC from recipient mailboxes, the messages that were part of the malicious email campaigns in real-time;

optimizing, by the ISC based on machine learning from the alphanumeric similarities in the filenames of the attached files, the cosine-termset similarity threshold; and providing, by the ISC, at least one notification for the malicious email campaigns that were detected.

* * * * *